US012510913B2

(12) United States Patent
Anderson

(10) Patent No.: US 12,510,913 B2
(45) Date of Patent: Dec. 30, 2025

(54) LOW SUPPLY HEADROOM BANDGAP VOLTAGE REFERENCE

(71) Applicant: Analog Devices, Inc., Wilmington, MA (US)

(72) Inventor: Michael Brian Anderson, Colorado Springs, CO (US)

(73) Assignee: Analog Devices, Inc., Wilmington, MA (US)

( * ) Notice: Subject to any disclaimer, the term of this patent is extended or adjusted under 35 U.S.C. 154(b) by 214 days.

(21) Appl. No.: 18/510,373

(22) Filed: Nov. 15, 2023

(65) Prior Publication Data

US 2025/0155908 A1 May 15, 2025

(51) Int. Cl.

| | |
|---|---|
| ***G05F 1/10*** | (2006.01) |
| ***G05F 1/46*** | (2006.01) |
| ***G05F 1/567*** | (2006.01) |
| ***G05F 3/16*** | (2006.01) |
| ***G05F 3/30*** | (2006.01) |

(52) U.S. Cl.

CPC .................. *G05F 3/30* (2013.01); *G05F 1/10* (2013.01); *G05F 1/468* (2013.01); *G05F 1/567* (2013.01); *G05F 3/16* (2013.01)

(58) Field of Classification Search

CPC ... G05F 3/30; G05F 1/10; G05F 1/468; G05F 1/567; G05F 3/16

See application file for complete search history.

(56) References Cited

U.S. PATENT DOCUMENTS

| | | | | |
|---|---|---|---|---|
| 4,447,784 A | | 5/1984 | Dobkin | |
| 6,292,050 B1 | | 9/2001 | Dooley et al. | |
| 6,462,526 B1 | * | 10/2002 | Tanase | G05F 3/30 327/539 |
| 7,420,359 B1 | * | 9/2008 | Anderson | G05F 3/30 327/535 |
| 8,508,211 B1 | | 8/2013 | Anderson | |

* cited by examiner

*Primary Examiner* — Sean Kayes
*Assistant Examiner* — Jonathan Walter Soileau
(74) *Attorney, Agent, or Firm* — Schwegman Lundberg & Woessner, P.A.

(57) ABSTRACT

A low supply headroom bandgap voltage reference generation circuit for generating a bandgap reference voltage from a supply voltage can include a first delta base-to-emitter voltage generation circuit, which can include a first Darlington configuration of a first pair of transistors arranged in a differential pair with a second Darlington configuration of a second pair of transistors. A first input to the first Darlington pair of transistors can be connected to an output voltage node of the bandgap voltage reference generation circuit and a second input to the second Darlington pair of transistors can be connected to the output voltage node of the bandgap voltage reference generation circuit via a first delta base-to-emitter-voltage resistor.

20 Claims, 6 Drawing Sheets

LOW SUPPLY HEADROOM BANDGAP VOLTAGE REFERENCE

TECHNOLOGICAL FIELD

The present disclosure relates to electronics, and more particularly, but not by way of limitation, to a bandgap voltage reference generation circuit that can operate with a reduced headroom between a supply voltage node and an output voltage as compared to one or more other bandgap voltage reference generation circuits.

BACKGROUND

Many integrated circuit functions can be helped by precise voltage and current references. For example, an analog-to-digital converter typically can use a precise voltage reference to establish and quantize an analog input voltage range. In another example, some analog filters, such as transconductance-capacitance filters, can have filter gain and rolloff frequency characteristics that depend upon their bias currents. For example, a precise current reference can be useful for generating accurate bias currents in such filters and other circuits.

SUMMARY

The present inventor has recognized, among other things, that it can be desirable to have a bandgap reference circuit that has one or more of a limited noise level or a limited headroom between a supply voltage level and a bandgap reference output voltage level. The noise level can be increased if the resistance value of a resistive element arranged between the supply voltage source and the bandgap reference output level is decreased, so it can be desirable to lower the headroom in ways alternatively or in addition to decreasing one or more resistance values.

In an example, a low supply headroom bandgap voltage reference generation circuit for generating a bandgap reference voltage from a supply voltage can include a first delta base-to-emitter voltage generation circuit, which can include a first Darlington configuration of a first pair of transistors arranged in a differential pair with a second Darlington configuration of a second pair of transistors. A first input to the first Darlington pair of transistors can be connected to an output voltage node of the bandgap voltage reference generation circuit and a second input to the second Darlington pair of transistors can be connected to the output voltage node of the bandgap voltage reference generation circuit via a first delta base-to-emitter-voltage resistor.

In an example, a low supply headroom bandgap voltage reference generation circuit for generating a bandgap reference voltage from a supply voltage can include a first delta base-to-emitter voltage generation circuit, which can include a first Darlington configuration of a first pair of transistors arranged in a differential pair with a second Darlington configuration of a second pair of transistors. A first input to the first Darlington pair of transistors can be connected to an output voltage node of the bandgap voltage reference generation circuit and a second input to the second Darlington pair of transistors can be connected to the output voltage node of the bandgap voltage reference generation circuit via a first delta base-to-emitter-voltage resistor. A connection between the second input and the first delta base-to-emitter-voltage resistor can form an intermediate node. The bandgap voltage reference generation circuit can also include a base-to-emitter voltage generation circuit, which can be arranged between the intermediate node and a ground node.

In an example, a method for operating a low supply headroom bandgap voltage reference circuit for generating a bandgap reference voltage from a supply voltage can include generating a first current density in a first Darlington configuration of a first pair of transistors. The method can also include generating a second current density in a second Darlington configuration of a second pair of transistors. The method can also include generating a difference in base-to-emitter voltage between the first Darlington configuration and the second Darlington configuration using a first delta base-to-emitter-voltage resistor to produce a proportional-to-absolute temperature current that can be used for generating a temperature-stabilized bandgap reference voltage.

BRIEF DESCRIPTION OF THE DRAWINGS

In the drawings, which may not be drawn to scale, like numerals may describe substantially similar components throughout one or more of the views. Like numerals having different letter suffixes may represent different instances of substantially similar components. The drawings illustrate generally, by way of example but not by way of limitation.

DETAILED DESCRIPTION

A bandgap voltage reference can be produced by summing a proportional to absolute temperature (PTAT) voltage and a complementary to absolute temperature (CTAT) voltage together. This can generate a temperature-independent voltage, or a voltage with a reduced dependence on temperature, such as over a specified range of temperatures. A CTAT voltage can be produced using a diode or diode-connected Bipolar Junction Transistor (BJT). A PTAT voltage can be produced by developing a voltage across a resistor biased with a PTAT current.

A delta base-to-emitter (ΔVbe) voltage generation circuit can be employed to generate a PTAT current using two BJTs with different current densities. The PTAT current can be proportional to the logarithm of the current density ratio of the two BJTs. Bandgap voltage references using delta base-to-emitter voltage generation circuits are described in Anderson, U.S. Pat. No. 8,508,211 entitled "METHOD AND SYSTEM FOR DEVELOPING LOW NOISE BANDGAP REFERENCES" filed on Nov. 12, 2009, which is hereby incorporated by reference herein in its entirety.

The difference in current densities can be achieved by passing an identical current through transistors with different base-emitter junction areas, passing different current values through transistors with the same areas, or using different values of both the current and area. To obtain a larger transistor area, transistors can be arranged in parallel (e.g., 10 identical transistors wired in parallel can have an effective area of 10 times a single one of the transistors).

Figure 1:
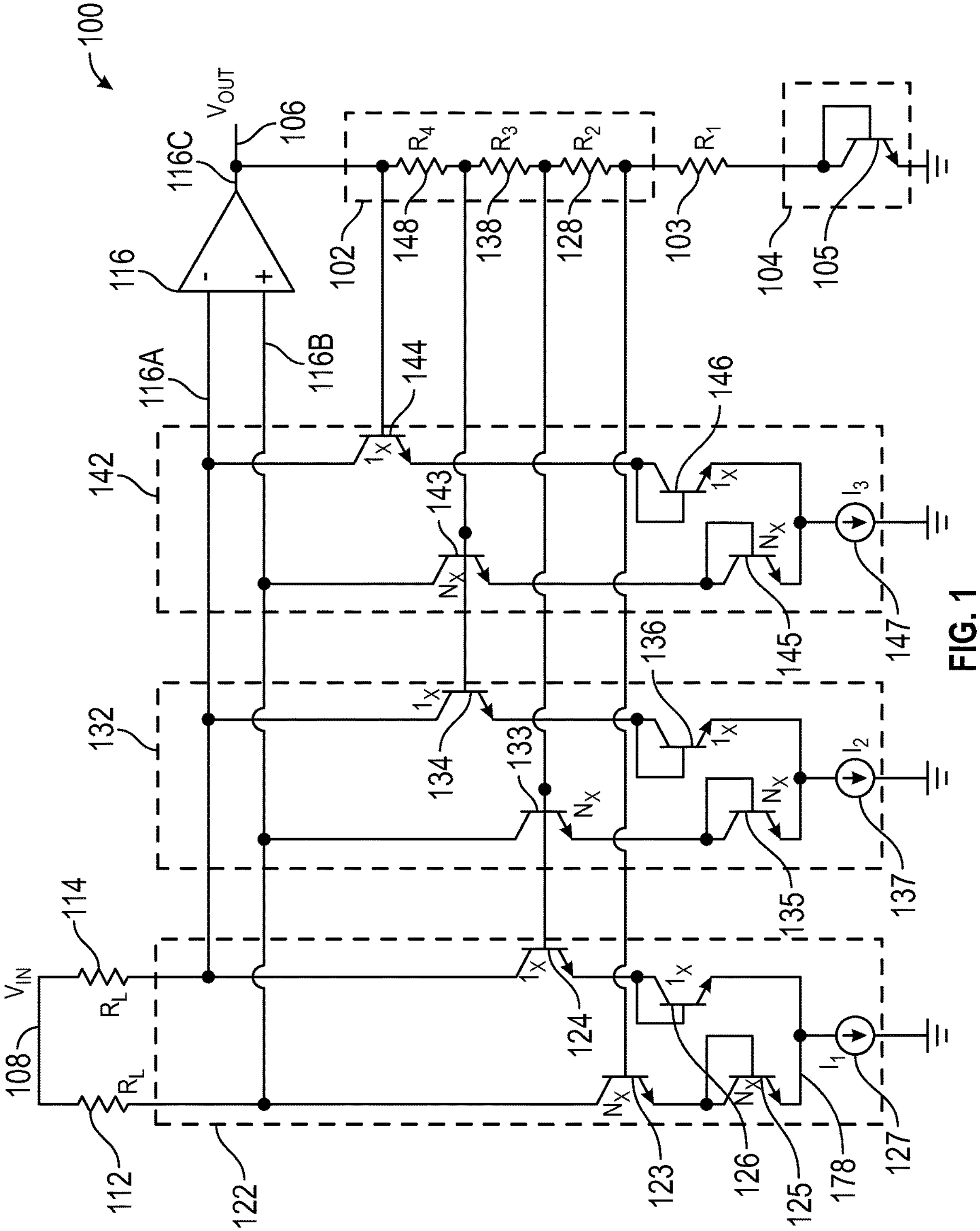
FIG. 1 is a schematic drawing of an example of portions of a bandgap reference circuit.

FIG. 1 is a schematic drawing of an example of portions of a bandgap reference circuit 100. FIG. 1 shows that the bandgap reference circuit 100 can include a supply voltage node 108 carrying the supply voltage, a bandgap reference output voltage node 106 carrying the bandgap reference output voltage, an operational amplifier 116, a PTAT voltage block 102, a CTAT voltage block 104, a first delta base-to-emitter voltage generation circuit 122, a second delta base-to-emitter voltage generation circuit 132, and a third delta base-to-emitter voltage generation circuit 142.

The operational amplifier 116 can include an inverting input 116A, a non-inverting input 116B, and an output 116C. The operational amplifier 116 can be configured to one or more of provide a high input impedance (e.g., limit the current on one or more of the inverting input 116A or the non-inverting input 116B), amplify a voltage difference between the inverting input 116A and the non-inverting input 116B on the output 116C (e.g., provide a gain such as can include 10 times, 100 times, 1,000 times, 10,000 times, 100,000 times, 1,000,000 times, or greater), or provide a low output impedance (e.g., generate a consistent output voltage regardless of output current). When the operational amplifier 116 is connected with one or more feedback signals between the output 116C and the inverting input 116A and/or the non-inverting input 116B, the operational amplifier 116 can operate to limit a voltage difference between the inverting input 116A and the non-inverting input 116B, such as can include limiting the voltage difference to near zero for practical purposes.

The output 116C can be coupled to the bandgap reference output voltage node 106. The non-inverting input 116B can be coupled to the supply voltage node 108 through a first load resistor 112. The inverting input 116A can be coupled to the supply voltage node 108 through a second load resistor 114.

The first load resistor 112 can have a resistance value, such as can include one or more of a resistance value provided by a resistive element, or an effective resistance value provided by an active load (e.g., a transistor, a switched capacitor circuit, etc.). The second load resistor 114 can be configured similarly to the first load resistor 112, or can differ in one or more ways. The resistance value of the first load resistor 112 can match or be substantially the same as the second load resistor 114. A first end of the first load resistor 112 can be coupled to the supply voltage node 108. A second end of the first load resistor 112 can be coupled to the non-inverting input 116B. A first end of the second load resistor 114 can be coupled to the supply voltage node 108. A second end of the second load resistor 114 can be coupled to the inverting input 116A.

In an example where the first load resistor 112 has the same resistance as the second load resistor 114, the operational amplifier 116 can operate to maintain a current through the first load resistor 112 that is substantially similar or identical to the current through the second load resistor 114.

The first delta base-to-emitter voltage generation circuit 122 can include a transistor 123, a transistor 124, a transistor 125, a transistor 126, and a first bias current sink 127. The transistor 123 and the transistor 124 can be configured as a differential pair. The input to the transistor 123 can be coupled to the bottom of the first delta base-to-emitter voltage resistor 128. The input to the transistor 124 can be coupled to the top of the first delta base-to-emitter voltage resistor 128. The transistor 125 can be a diode-connected transistor (e.g., the base of the transistor can be coupled to the collector of the transistor) that can be configured to follow the transistor 123. The transistor 126 can be a diode-connected transistor that can be configured to follow the transistor 124.

A first conduction terminal of the transistor 123 can be coupled to the second end of the first load resistor 112. A first conduction terminal of the transistor 124 can be coupled to the second end of the second load resistor 114. A second conduction terminal of the transistor 123 can be coupled to a first conduction terminal of the transistor 125. A second conduction terminal of the transistor 124 can be coupled to a first conduction terminal of the transistor 126. A second conduction terminal of the transistor 125 can be coupled to a first shared node 178. A second conduction terminal of the transistor 126 can be coupled to the first shared node 178. The shared node can be coupled to a first bias current sink 127.

The first bias current sink 127 can generate a bias current through one or more of the transistor 123, the transistor 124, the transistor 125, or the transistor 126. The transistors can be bipolar junction transistors (BJT's), such as can include NPN BJT's (as shown in FIG. 1) or PNP BJT's. The transistor 124 and the transistor 126 can have an area, such as can be equal, such as can include a first unit area. The transistor 123 and the transistor 125 can have an area, such as can be equal, such as can be an area equal to the first unit area or any other area value, such as can include a fraction and/or multiple of the first unit area. In an example, the transistor 123 and the transistor 125 can have an area that can be equal to N times the area of the transistor 124 and the transistor 126, where N can be a positive real number. The bandgap reference circuit 100 can be configured to generate a current through the transistor 123 and the transistor 125 that can be equal to the current through the transistor 124 and the transistor 126, or the bandgap reference circuit 100 can be configured to generate a current through the transistor 123 and the transistor 125 that can be different from the current through the transistor 124 and the transistor 126. One or more of a differing area or a differing current between the pairs of transistors can generate a different current density in the transistor 123 and the transistor 125 than the transistor 124 and the transistor 126. This differing current density can generate a difference in base-to-emitter voltage between transistors. This differing current density can be used to generate a PTAT voltage across the first delta base-to-emitter voltage resistor 128. For example, a voltage across the voltage resistor 128 can be equal to the base-to-emitter voltage of the transistor 124 plus the base-to-emitter voltage of the transistor 126 minus the base-to-emitter voltage of the transistor 125 minus the base-to-emitter voltage of the transistor 123 (e.g., determined by following a Kirchhoff's voltage loop)

In FIG. 1 and throughout the rest of the figures, a black dot to the right of a transistor control terminal (e.g., a base of a BJT transistor), such as the black dot to the right of transistor 133, can be used to signify that the control terminal is coupled to the wire that continues on through the schematic representation of the transistor (e.g., the control terminal of transistor 133 is coupled to the wire shown passing through the control terminal of transistor 133).

The second delta base-to-emitter voltage generation circuit 132 can include a transistor 133, a transistor 134, a transistor 135, a transistor 136, and a second bias current sink 137. The voltage generation circuit 132 can be configured similarly to the voltage generation circuit 122, or can differ in one or more ways. The voltage generation circuit 132 may generate a PTAT voltage across the second delta base-to-emitter voltage resistor 138.

The third delta base-to-emitter voltage generation circuit 142 can include a transistor 143, a transistor 144, a transistor 145, a transistor 146, and a third bias current sink 147. The voltage generation circuit 142 can be configured similarly to the voltage generation circuit 122, or can differ in one or more ways. The voltage generation circuit 142 may generate a PTAT voltage across the third delta base-to-emitter voltage resistor 148.

Together, the first delta base-to-emitter voltage resistor 128, the second delta base-to-emitter voltage resistor 138, and the third delta base-to-emitter voltage resistor 148 can be coupled in a series arrangement to form the PTAT voltage block 102. The first delta base-to-emitter voltage resistor 128, the second delta base-to-emitter voltage resistor 138, and the third delta base-to-emitter voltage resistor 148 can all have the same resistance value, or they may have one or more differing values. The CTAT voltage block 104 can include one or more elements that provide a CTAT voltage, such as can include a diode-connected transistor 105. The diode-connected transistor 105 can be coupled between the gain setting resistor 103 and a ground node.

The gain setting resistor 103 can have any resistance value, such as can include a resistance value provided and/or simulated by an active component. The gain setting resistor 103 may help determine the voltage value on the bandgap reference output voltage node 106, such as can include by setting a gain of the bandgap reference circuit 100. A PTAT voltage can be generated across the gain setting resistor 103, such as can be due to a PTAT current generated in the PTAT voltage block 102.

The bandgap reference circuit 100 can include one or more delta base-to-emitter voltage generation circuits, such as can include one, two, three (e.g., as shown in FIG. 1), four, five, or six or more delta base-to-emitter voltage generation circuits. Each of the one or more delta base-to-emitter voltage generation circuits can include zero or more diode-connected resistors in each leg of the delta base-to-emitter voltage generation circuit, such as can include zero (e.g., diode-connected transistors, such as transistor 125 and transistor 126 are omitted), one (e.g., as shown in FIG. 1), two (e.g., another diode-connected transistor arranged in series in each leg) three, four, five, or six or more. An equation for the output voltage of the bandgap reference circuit 100 can be shown in Equation 1.

$$v_{OUT} = v_T\left(1 + \frac{R_1}{R_2}\right)\ln\left(N^{jk}\right) + v_{BE} \qquad \text{Equation 1}$$

In Equation 1, $v_T$ can be the thermal voltage, $R_1$ can be the resistance of the gain setting resistor 103, $R_2$ can be the resistance of the first delta base-to-emitter voltage resistor 128, N can be the area ratio between transistors in the one or more differential pairs discussed above, j can be the number of diode-connected transistors in each delta base-to-emitter voltage generation circuit, k can be the number of delta base-to-emitter voltage generation circuits, and $v_{BE}$ can be the value of the voltage across the CTAT voltage block 104, such as can include the base-to-emitter voltage of the diode-connected transistor 105. Increasing one or more of N, j, or k, can be desirable because it can one or more of increase the output voltage of the bandgap reference circuit 100, make the output of the bandgap reference circuit 100 less noisy, or make the output of the bandgap reference circuit 100 more stable across a temperature range. However, increasing one or more of N, j, or k, can one or more of increase a cost of the bandgap reference circuit 100, increase a size of the bandgap reference circuit 100, or increase a power consumption of the bandgap reference circuit 100. Values of N, j, or k, can be specified based on one or more considerations, such as can include to minimize one or more drawbacks while maximizing one or more benefits.

The output voltage of the bandgap reference circuit 100 can also be expressed as shown in Equation 2.

$$v_{OUT} = v_{IN} - v_{R_L} - v_{cb_{144}} \qquad \text{Equation 2}$$

In Equation 2, $v_{IN}$ can be the supply voltage on the supply voltage node 108, $v_{R_L}$ can be the voltage across the second load resistor 114, and $v_{cb_{144}}$ can be the base-to-collector voltage of the transistor 144. The minimum input voltage to produce a specified output voltage can be shown in Equation 3.

$$v_{IN_{MIN}} = v_{OUT} + v_{R_L} + v_{cb_{144}} = v_{OUT} + I_{R_L} * R_L + v_{cb_{144}} \qquad \text{Equation 3}$$

In equation 3, $I_{R_L}$ can be the current through the second load resistor 114 and $R_L$ can be the resistance value of the second load resistor 114. Reducing one or more of $I_{R_L}$ or $R_L$ can increase a noise level in the output voltage carried on the bandgap reference output voltage node 106. It may be desirable to reduce the $v_{IN_{MIN}}$ value without reducing one or more of $I_{R_L}$ or $R_L$. The headroom of the bandgap reference circuit 100 (e.g., the difference between the minimum supply voltage and the desired output voltage) can be shown in Equation 4.

$$\text{Headroom} = v_{IN_{MIN}} - v_{OUT} = v_{R_L} + v_{cb_{144}} \qquad \text{Equation 4}$$

Figure 2B:
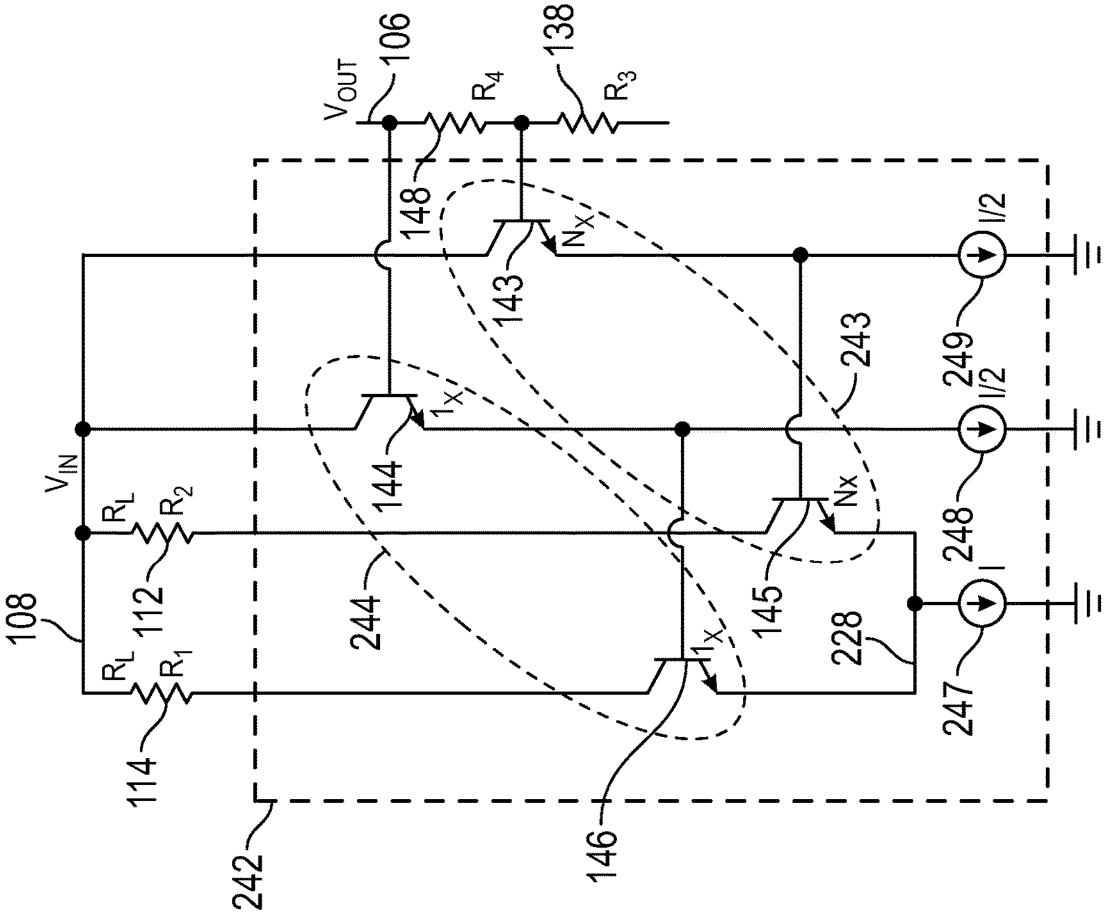
FIG. 2B is a schematic drawing of an example of portions of a delta base-to-emitter voltage generation circuit and portions of a bandgap reference circuit.
Figure 2A:
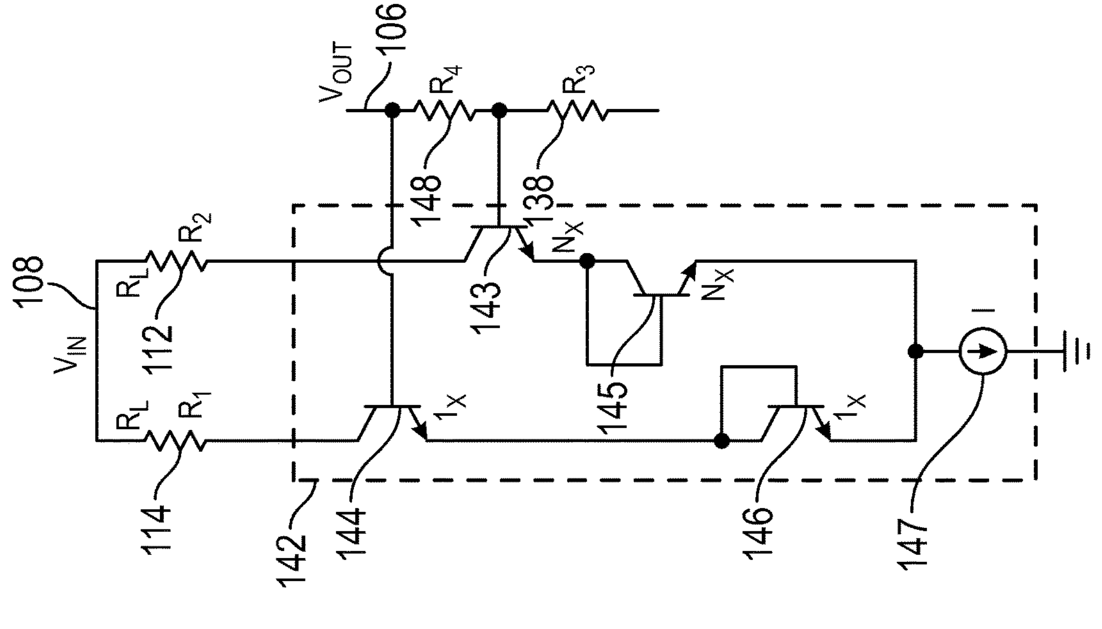
FIG. 2A is a schematic drawing of an example of portions of the third delta base-to-emitter voltage generation circuit of FIG. 1 and portions of a bandgap reference circuit of FIG. 1.

FIG. 2A is a schematic drawing of an example of portions of the third delta base-to-emitter voltage generation circuit 142 of FIG. 1 and portions of a bandgap reference circuit 100 of FIG. 1.

FIG. 2B is a schematic drawing of an example of portions of a delta base-to-emitter voltage generation circuit 242 and portions of a bandgap reference circuit. The delta base-to-emitter voltage generation circuit 242 of FIG. 2B can be a rearrangement of the delta base-to-emitter voltage generation circuit 142 of FIG. 2A, such as can include rearranging one or more transistors, such as can create a Darlington delta base-to-emitter voltage generation circuit.

FIG. 2B shows that the transistor 143 and the transistor 145 can be arranged in a first Darlington pair 243 (e.g., a Darlington configuration, such as can include an emitter of the transistor 143 can be coupled to a base of the 145). The transistor 144 and the transistor 146 can be arranged in a second Darlington pair 244 (e.g., a Darlington configuration, such as can include an emitter of the transistor 144 can be coupled to a base of the 146).

The first Darlington pair 243 can be arranged in a differential pair with the second Darlington pair 244. The input to the first Darlington pair 243 can be connected to the bandgap reference output voltage node 106. The input to the second Darlington pair 244 can be connected to the bandgap reference output voltage node 106 via the third delta-base-to-emitter voltage resistor 148.

The transistor 145 and/or the transistor 143 of FIG. 2B may not be diode-connected. A first conduction terminal of the transistor 145 can be coupled to the second end of the first load resistor 112. A first conduction terminal of the 146 can be coupled to the second end of the second load resistor 114. A second conduction terminal of the transistor 145 can be connected to a shared node 228. A second conduction terminal of the transistor 146 can be coupled to the shared node 228. The shared node 228 can be coupled to a first bias current sink 247.

A first conduction terminal of the transistor 143 can be coupled to the supply voltage node 108, such as can include coupling directly to the supply voltage node 108 without any intervening components (e.g., no components other than those necessary to complete the connection). A first conduction terminal of the transistor 144 can be coupled to the supply voltage node 108, such as can include coupling directly to the supply voltage node 108 without any intervening components. A second conduction terminal of the transistor 143 can be coupled to a second bias current sink 248. A second conduction terminal of the transistor 144 can be coupled to a third bias current sink 249. A current value of the second bias current sink 248 and/or the third bias current sink 249 may be half of a current value of the first bias current sink 247. If the circuit is configured so that the current from the first bias current sink 247 is shared equally between the transistor 146 and the transistor 145, a current value of all four transistors (143, 144, 145, and 146) in the delta base-to-emitter voltage generation circuit 242 may be the same or substantially the same. Because a current through the transistors in the circuit of FIG. 2A can be similar to a current through the transistors in the circuit of FIG. 2B, an operating point of the transistors may be substantially similar.

The delta base-to-emitter voltage generation circuit 242 can behave similarly to the third delta base-to-emitter voltage generation circuit 142, or the behavior may differ in one or more ways. The voltage generated across the third delta base-to-emitter voltage resistor 148 can be the same or different for the circuit of FIG. 2B than the bandgap reference circuit 100 of FIG. 2A. In either case, the voltage across the third delta base-to-emitter voltage resistor 148 can be a PTAT voltage, such as can be used in a bandgap voltage reference generation circuit.

The delta base-to-emitter voltage generation circuit 242 may provide a lower headroom than the first delta base-to-emitter voltage generation circuit 142. For example, a headroom of a circuit using the delta base-to-emitter voltage generation circuit 242 can be described by Equation 5.

$$\text{Headroom} = v_{IN_{MIN}} - v_{OUT} = v_{cb_{144}} \qquad \text{Equation 5}$$

Equation 5 shows that the headroom value can be equal to the collector-to-base voltage of the transistor 144 because there is no intervening circuitry between the transistor 144 and the supply voltage node 108.

Figure 3:
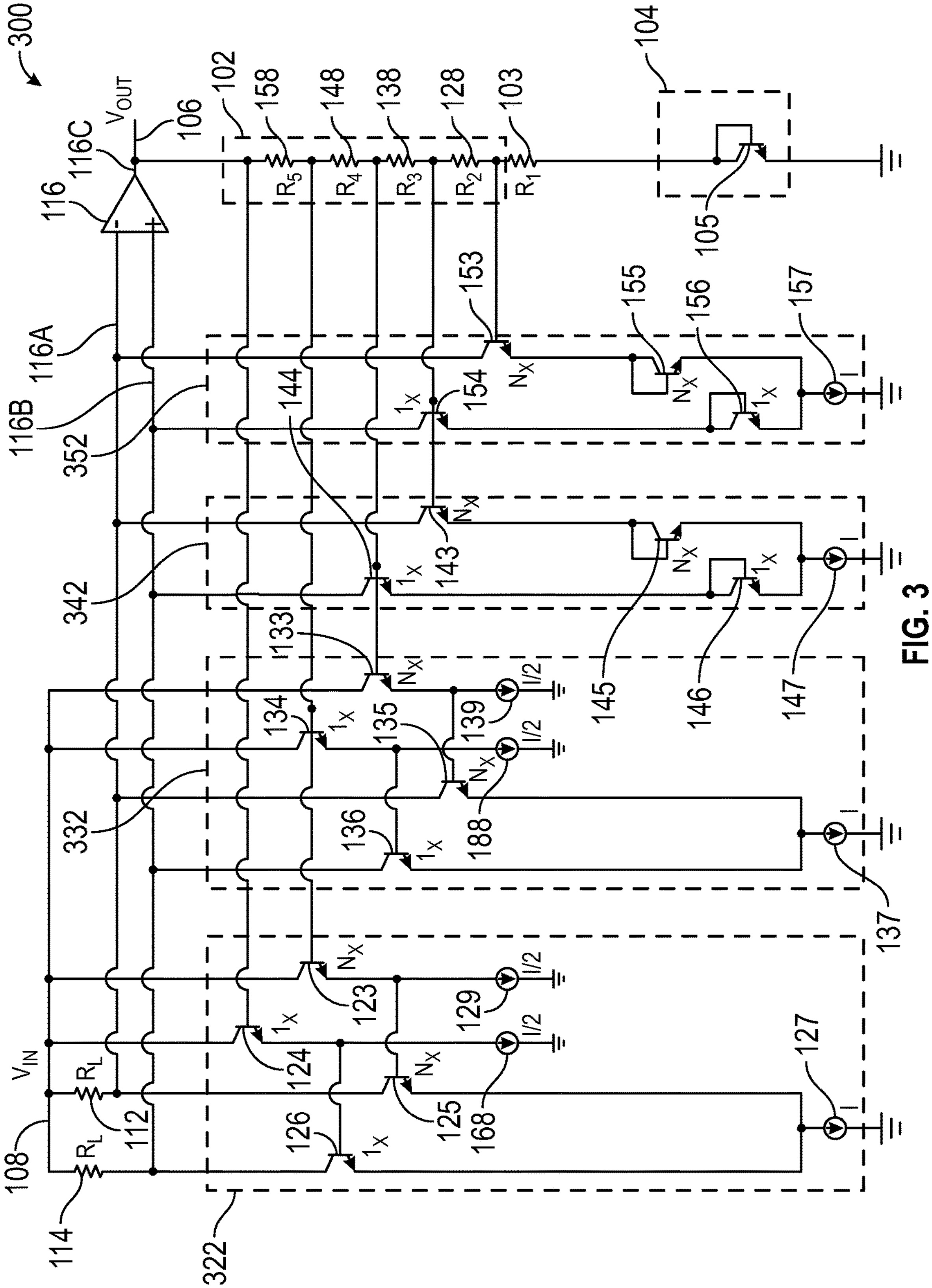
FIG. 3 is a schematic drawing of an example of portions of a bandgap reference circuit.

FIG. 3 is a schematic drawing of an example of portions of a bandgap reference circuit 300. In the example of FIG. 3, the bandgap reference circuit 300 can include a supply voltage node 108 carrying the supply voltage, a bandgap reference output voltage node 106 carrying the bandgap reference output voltage, an operational amplifier 116, a PTAT voltage block 102, a CTAT voltage block 104, a first delta base-to-emitter voltage generation circuit 322, a second delta base-to-emitter voltage generation circuit 332, and a third delta base-to-emitter voltage generation circuit 342, and a fourth delta base-to-emitter voltage generation circuit 352. The bandgap reference circuit 300 can be configured similarly to the bandgap reference circuit 100 of FIG. 1, except that the first delta base-to-emitter voltage generation circuit 322 and the second delta base-to-emitter voltage generation circuit 332 can be configured in a Darlington configuration, such as can include being configured similarly to the circuit of FIG. 2B, and there can be an extra delta base-to-emitter voltage generation circuit.

The first delta base-to-emitter voltage generation circuit 322 can be a Darlington delta base-to-emitter voltage generation circuit, such as can be similar or identical to the circuit of FIG. 2B. The first delta base-to-emitter voltage generation circuit 322 can include a transistor 123, a transistor 124, a transistor 125, a transistor 126, a first bias current sink 127, a second bias current sink 168, and a third bias current sink 129. The first delta base-to-emitter voltage generation circuit 322 can generate a voltage across a fourth delta base-to-emitter voltage resistor 158.

The second delta base-to-emitter voltage generation circuit 332 can be a Darlington delta base-to-emitter voltage generation circuit, such as can be similar or identical to the circuit of FIG. 2B. The second delta base-to-emitter voltage generation circuit 332 can include a transistor 133, a transistor 134, a transistor 135, a transistor 136, a first bias current sink 137, a second bias current sink 188, and a third bias current sink 139. The first delta base-to-emitter voltage generation circuit 332 can generate a voltage across a third delta base-to-emitter voltage resistor 148.

The third delta base-to-emitter voltage generation circuit 342 can be a delta base-to-emitter voltage generation circuit configured similarly to the first delta base-to-emitter voltage generation circuit 122 of FIG. 1. The third delta base-to-emitter voltage generation circuit 342 can include a transistor 143, a transistor 144, a transistor 145, a transistor 146, and a first bias current sink 147. The third delta base-to-emitter voltage generation circuit 342 can generate a voltage across a second delta base-to-emitter voltage resistor 138.

The fourth delta base-to-emitter voltage generation circuit 352 can be a delta base-to-emitter voltage generation circuit configured similarly to the first delta base-to-emitter voltage generation circuit 122. The fourth delta base-to-emitter voltage generation circuit 352 can include a transistor 153, a transistor 154, a transistor 155, a transistor 156, and a first bias current sink 157. The fourth delta base-to-emitter voltage generation circuit 352 can generate a voltage across a first delta base-to-emitter voltage resistor 128.

The bandgap reference circuit 300 can include one or more Darlington delta base-to-emitter voltage generation circuits such as can include one, two (as shown in FIG. 3), three, four, five, or six or more. The bandgap reference circuit 300 can include zero or more non-Darlington delta base-to-emitter voltage generation circuits such as can include zero, one, two (as shown in FIG. 3), three, four, five, or six or more. An output voltage equation for the bandgap reference circuit 300 can be similar to the output voltage equation for the bandgap reference circuit 100, and can be shown in Equation 6.

$$v_{OUT} = v_T\left(1 + \frac{R_1}{R_2}\right)\ln\left(N^{jk}\right) + v_{BE} \quad \text{Equation 6}$$

In Equation 6, $v_T$ can be the thermal voltage, $R_1$ can be the resistance of the gain setting resistor 103, $R_2$ can be the resistance of the first delta base-to-emitter voltage resistor 128, N can be the area ratio discussed above, j can be the number of diode connected transistors in each delta base-to-emitter voltage generation circuit (e.g., for Darlington delta base-to-emitter voltage generation circuits, the Darlington follower can be counted as the first diode-connected transistor, additional diode-connected transistors can be connected below the Darlington follower), k can be the number of delta base-to-emitter voltage generation circuits (e.g., the total number including Darlington and non-Darlington), and $v_{BE}$ can be the value of the voltage across the CTAT voltage block 104, such as can include the base-to-emitter voltage of the diode-connected transistor 105.

The headroom of the bandgap reference circuit 300 can be shown by Equation 7.

$$\text{Headroom} = v_{IN_{MIN}} - v_{OUT} = v_{cb_{124}} \quad \text{Equation 7}$$

In Equation 7 $v_{cb_{124}}$ can be the collector-to-base voltage of the transistor 124. In an example, the voltage across the fourth delta base-to-emitter voltage resistor 158 and the third delta base-to-emitter voltage resistor 148 in series can be less than the voltage across the second load resistor 114, and the headroom can instead be shown by equation 8.

$$\text{Headroom} = v_{IN_{MIN}} - v_{OUT} = v_{cb_{144}} + I_{R_L} * R_L - V_{R_5} - V_{R_4} \quad \text{Equation 8}$$

In equation 8, $v_{cb_{144}}$ can be the collector-to-base voltage of the transistor 124, $I_{R_L}$ can be the current through the second load resistor 114 and $R_L$ can be the resistance value of the second load resistor 114, $v_{R_5}$ can be the voltage across the fourth delta base-to-emitter voltage resistor 158 (e.g., the voltage generated by the first delta base-to-emitter voltage generation circuit 322), and $v_{R_4}$ can be the voltage across the third delta base-to-emitter voltage resistor 148 (e.g., the voltage generated by the first delta base-to-emitter voltage generation circuit 332). The number of Darlington vs. non-Darlington delta base-to-emitter voltage generation circuits may be selected based upon one or more estimated or specified voltages to minimize a headroom (e.g., use a sufficient number or Darlington circuits so that the headroom can be limited by the collector-to-base voltage of the first non-Darlington configured delta base-to-emitter generation circuit).

Figure 4:
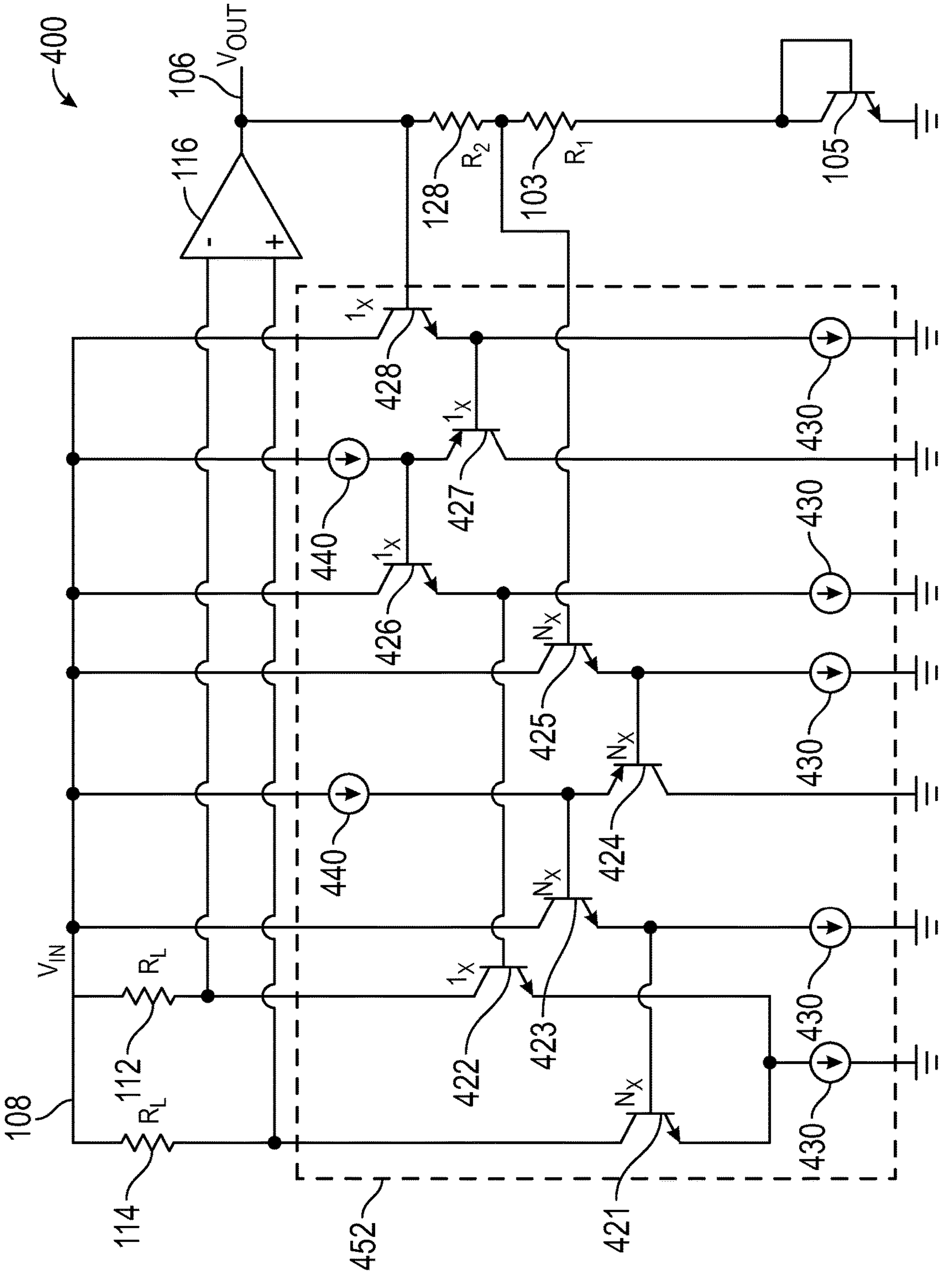
FIG. 4 is a schematic drawing of an example of portions of a bandgap reference circuit.

FIG. 4 is a schematic drawing of an example of portions of a bandgap reference circuit 400. One or more portions of the bandgap reference circuit 400 can be similar to the bandgap reference circuit 300, except that the bandgap reference circuit 400 includes a single delta base-to-emitter voltage generation circuit that can be configured differently from the delta base-to-emitter voltage generation circuits of the bandgap reference circuit 300. The delta base-to-emitter voltage generation circuit 452 of FIG. 4 can include one or more current sinks 430, one or more current sources 440, and one or more transistors (e.g., transistor 421, transistor 422, transistor 423, transistor 424, transistor 425, transistor 426, transistor 427, and transistor 428).

The delta base-to-emitter voltage generation circuit 452 can be configured to sum multiple base-to-emitter voltages around a Kirchoff's voltage loop, such as can include without requiring the transistors be stacked in the same legs, such as can reduce a headroom. The transistor 428 and the transistor 425 can form a differential pair, with an input to the 428 coupled to the bandgap reference output voltage node 106 and an input to the 425 coupled to the bandgap reference output voltage node 106 through the voltage resistor 128. The transistor 428 can be followed (e.g., the circuit is configured so that one or more following transistors behave similarly to the followed transistor (e.g., same operating point, same base-to-emitter voltage, etc.), such as can include a Darlington configuration) by the transistor 427, the transistor 426, and the transistor 422. The transistor 425 can be followed by the transistor 424, the transistor 423 and the transistor 421. The use transistors 424 and 427 may be PNP transistors, and transistors 421, transistor 422, transistor 423, transistor 425, transistor 427, and transistor 428 may be NPN transistors. The PNP transistors may be biased using a one or more current sources 440. The NPN transistors may be biased using a one or more current sinks 430. The bandgap reference voltage on the bandgap reference output voltage node 106 can be shown by equation 8.

$$v_{OUT} = v_T\left(1 + \frac{R_1}{R_2}\right)\ln\left(N^{j}\right) + v_{BE} \quad \text{Equation 8}$$

In Equation 8, j can be the number of following transistors (e.g., FIG. 4 shows an example with 3 following transistors). In an example, the delta base-to-emitter voltage generation circuit 452 can include additional pairs of following resistors, such as can be configured similarly to the pair formed by transistor 426 and transistor 427 and the pair formed by transistor 425 and transistor 424. In an example, a bandgap reference circuit 400 can include more than one following configured delta base-to-emitter voltage generation circuits, such as can be similar to the delta base-to-emitter voltage generation circuit 452. The bandgap reference circuit 400 can also include one or more of one or more non-Darlington configured delta base-to-emitter voltage generation circuits (e.g. such as the third delta base-to-emitter voltage generation circuit 342 of FIG. 3) or one or more Darlington configured delta base-to-emitter voltage generation circuits (e.g. such as the first delta base-to-emitter voltage generation circuit 322 of FIG. 3).

Figure 5:
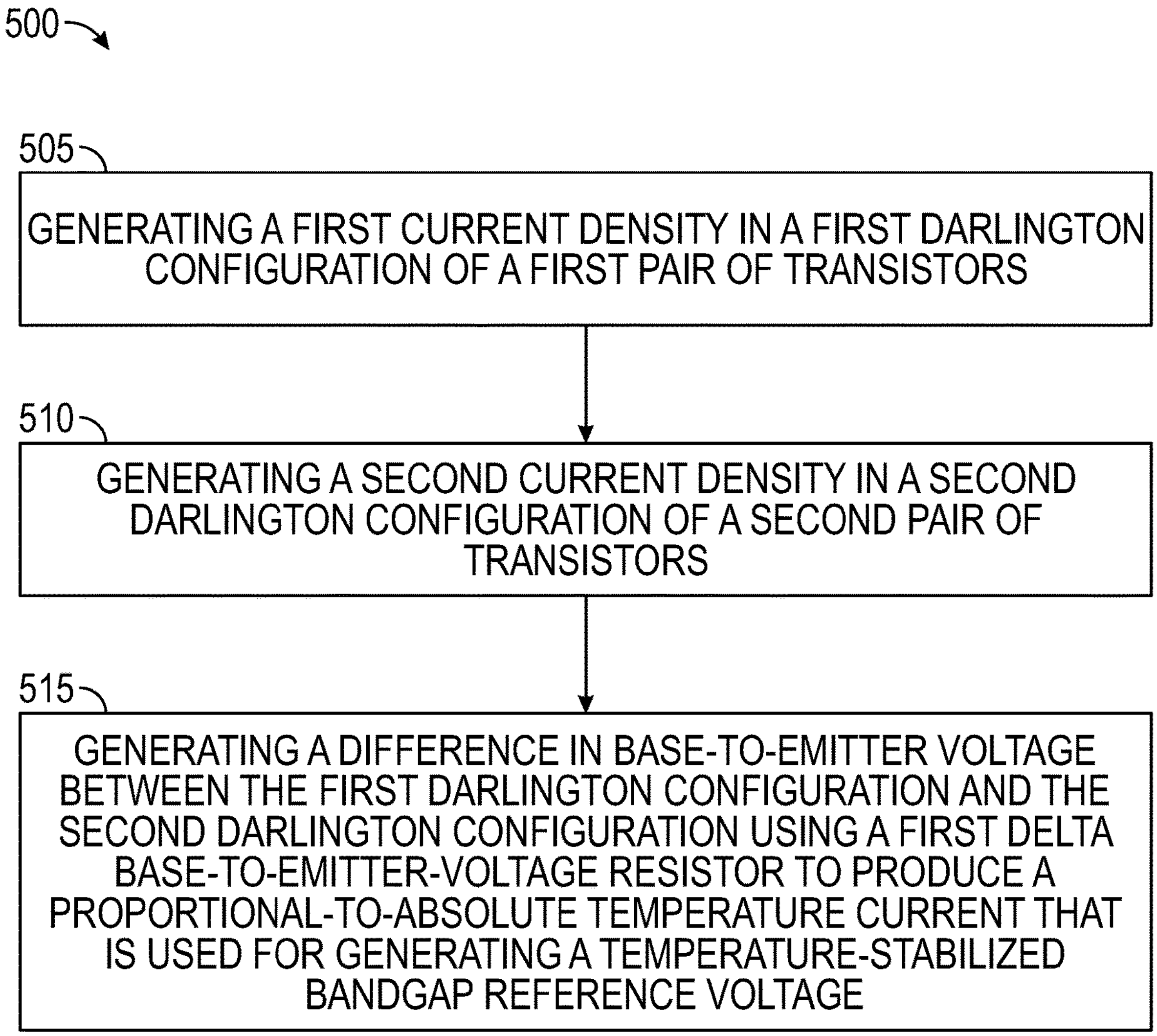
FIG. 5 is a diagram showing an example of a method for operating portions of a bandgap reference circuit.

FIG. 5 is a diagram showing an example of a method 500 for operating portions of a bandgap reference circuit. At step 505, a first current density can be generated in a first Darlington configuration of a first pair of transistors. At 510, a second current density can be generated in a second Darlington configuration of a second pair of transistors. At 515, a difference in base-to-emitter voltage between the first Darlington configuration and the second Darlington configuration can be generated using a first delta base-to-emitter-voltage resistor to produce a proportional-to-absolute temperature current that can be used for generating a temperature-stabilized bandgap reference voltage. The shown order of steps is not intended to be a limitation on the order the steps are performed in. In an example, two or more steps can be performed simultaneously or at least partially concurrently.

The method 500 can be performed using a bandgap voltage generation circuit, such as the bandgap reference circuit 300. For example, the first Darlington pair can include the transistor 124 and the transistor 126 and the second Darlington pair can include the transistor 123 and the transistor 125. In an example, optional additional steps can also include one or more of provide a first conduction terminal of a first transistor in the first Darlington configuration a supply voltage through a first reference resistor coupled to a supply voltage node; provide a first conduction terminal of a second transistor in the first Darlington configuration a supply voltage from the supply voltage node; provide a first conduction terminal of a third transistor in the second Darlington configuration a supply voltage through a second reference resistor coupled to the supply voltage node; or provide a first conduction terminal of a fourth transistor in the second Darlington configuration a supply voltage from the supply voltage node.

In an example, an optional additional step may be to derive a bandgap reference output value from a control terminal of the second transistor. In an example, an optional additional step can be maintain a same voltage on the first conduction terminal of the first transistor and the first conduction terminal of the third transistor using a differential amplifier, the differential amplifier including a first input coupled to the first conduction terminal of the first transistor, a second input coupled to the first conduction terminal of the third transistor, and an output coupled to the control terminal of the second transistor.

The systems, techniques, and methods described herein are believed to apply, at least in part, to a variety of bandgap generation circuits, including bandgap voltage generation circuits of a variety of styles and/or bandgap voltage generation circuits using one or more types or resistors (BJT, field effect transistor (FET), etc.).

Figure 6:
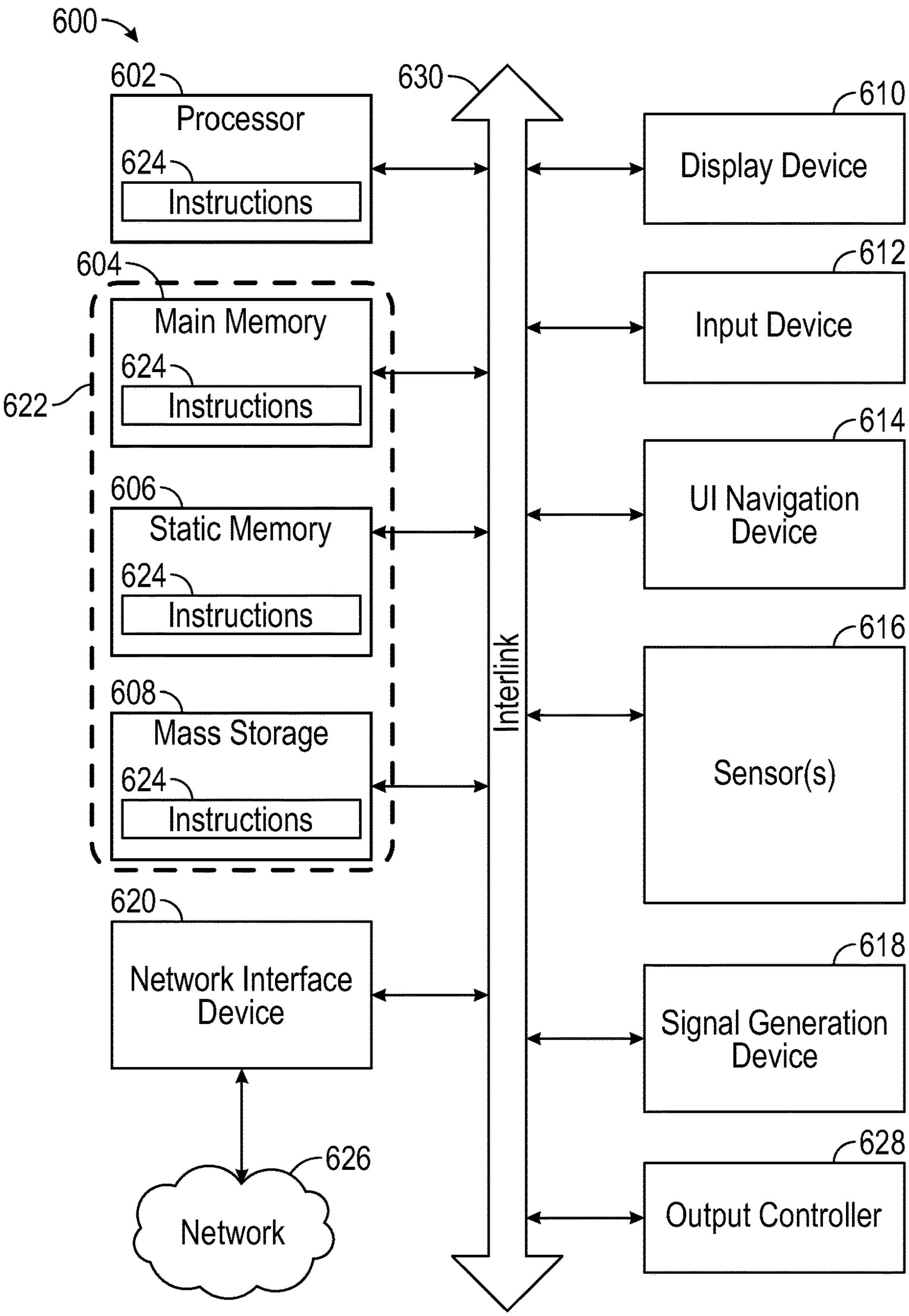
FIG. 6 is a block diagram of an example of portions of a machine upon which one or more portions of the present disclosure can be implemented.

FIG. 6 is a block diagram of an example of portions of a machine 600 upon which one or more portions of the present disclosure may be implemented. Examples, as described herein, may include, or may operate by, logic or a number of components, or mechanisms in the machine 600. Circuitry (e.g., processing circuitry) is a collection of circuits implemented in tangible entities of the machine 600 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 600 follow.

In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 600 may include a hardware processor 602 (e.g., a central processing unit (CPU), a graphics processing unit (GPU), a hardware processor core, or any combination thereof), a main memory 604, a static memory (e.g., memory or storage for firmware, microcode, a basic-input-output (BIOS), unified extensible firmware interface (UEFI), etc.) 606, and mass storage 608 (e.g., hard drives, tape drives, flash storage, or other block devices) some or all of which may communicate with each other via an interlink (e.g., bus) 630. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 608, a signal generation device 618 (e.g., a speaker), a network interface device 620, and one or more sensors 616, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 602, the main memory 604, the static memory 606, or the mass storage 608 may be, or include, a machine readable medium 622 on which is stored one or more sets of data structures or instructions 624 (e.g., software) embodying or utilized by any one or more of the techniques or functions described herein. The instructions 624 may also reside, completely or at least partially, within any of registers of the processor 602, the main memory 604, the static memory 606, or the mass storage 608 during execution thereof by the machine 600. In an example, one or any combination of the hardware processor 602, the main memory 604, the static memory 606, or the mass storage 608 may constitute the machine readable media 622. While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 622 may be representative of the instructions 624, such as instructions 624 themselves or a format from which the instructions 624 may be derived. This format from which the instructions 624 may be derived may include source code, encoded instructions (e.g., in compressed or encrypted form), packaged instructions (e.g., split into multiple packages), or the like. The information representative of the instructions 624 in the machine readable medium 622 may be processed by processing circuitry into the instructions to implement any of the operations discussed herein. For example, deriving the instructions 624 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 624.

In an example, the derivation of the instructions 624 may include assembly, compilation, or interpretation of the information (e.g., by the processing circuitry) to create the instructions 624 from some intermediate or preprocessed format provided by the machine readable medium 622. The information, when provided in multiple parts, may be combined, unpacked, and modified to create the instructions 624. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 624 may be further transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software. A transmission medium is a machine readable medium.

Additional Notes & Examples

Example 1 is a low supply headroom bandgap voltage reference generation circuit for generating a bandgap reference voltage from a supply voltage, the bandgap voltage reference generation circuit comprising: a first delta base-to-emitter voltage generation circuit, comprising a first Darlington configuration of a first pair of transistors arranged in a differential pair with a second Darlington configuration of a second pair of transistors, wherein: a first input to the first Darlington pair of transistors is connected to an output voltage node of the bandgap voltage reference generation circuit; and a second input to the second Darlington pair of transistors is connected to the output voltage node of the bandgap voltage reference generation circuit via a first delta base-to-emitter-voltage resistor.

In Example 2, the subject matter of Example 1 optionally includes wherein a bandgap reference output voltage value carried on the output voltage node is equal to a supply voltage less a collector-to-base voltage of a first transistor in the second Darlington pair of transistors.

In Example 3, the subject matter of any one or more of Examples 1-2 optionally include a first reference resistor and a second reference resistor, wherein a first end of the first reference resistor and a first end of a second reference resistor are coupled to a supply voltage node; wherein a first conduction terminal of a first transistor in the first Darlington pair of transistors is connected to the second end of the first reference resistor and a first conduction terminal of a second transistor in the first Darlington pair of transistors is coupled to the supply voltage node; and wherein a first conduction terminal of a third transistor in the second Darlington pair of transistors is connected to the second end of the second reference resistor and a first conduction terminal of a fourth transistor in the second Darlington pair of transistors is coupled to the supply voltage node.

In Example 4, the subject matter of Example 3 optionally includes wherein a second conduction terminal of the first transistor and a second conduction terminal of the third transistor are coupled together at a shared node; wherein the shared node is coupled to a first bias current sink; wherein a second conduction terminal of the second transistor is coupled to a second bias current sink; wherein a second conduction terminal of the fourth transistor is coupled to a third bias current sink; and wherein a first bias current value of the first bias current sink is twice as large as a (1) second bias current value of the second bias current sink and is twice as large as (2) a third bias current value of the third bias current sink.

In Example 5, the subject matter of Example 4 optionally includes a differential amplifier, wherein a first input of the differential amplifier is coupled to a second end of the first reference resistor, wherein a second input of the differential amplifier is coupled to a second end of the second reference resistor.

In Example 6, the subject matter of Example 5 optionally includes wherein an output of the differential amplifier is coupled to the output voltage node.

In Example 7, the subject matter of Example 6 optionally includes wherein the first current value is shared equally between the first transistor and the third transistor.

In Example 8, the subject matter of any one or more of Examples 3-7 optionally include wherein the first transistor and the second transistor are bipolar junction transistors (BJTs); wherein a collector of the first transistor is coupled to the second end of the first reference resistor; wherein a collector of the second transistor is coupled to the supply voltage node; and wherein an emitter of the second transistor is coupled to a base of the first transistor.

In Example 9, the subject matter of Example 8 optionally includes wherein an area of the first transistor and second transistor is different than an area of the third transistor and fourth transistor.

In Example 10, the subject matter of any one or more of Examples 8-9 optionally include wherein a base of the second transistor is coupled to the output voltage node carrying a bandgap reference output voltage value, wherein the bandgap reference output voltage value is equal to a supply voltage value carried on the supply voltage node less a collector to base voltage of the second transistor.

In Example 11, the subject matter of any one or more of Examples 3-10 optionally include wherein at least one of the first reference resistor and the second reference resistor include an active load.

In Example 12, the subject matter of any one or more of Examples 1-11 optionally include at least one additional delta base-to-emitter voltage generation circuit.

In Example 13, the subject matter of Example 12 optionally includes wherein at least one of the at least one additional delta base-to-emitter voltage generation circuit includes a third Darlington configuration of a third pair of transistors arranged in a differential pair with a fourth Darlington configuration of a fourth pair of transistors, wherein: a third input to the third Darlington pair of transistors is connected to the output voltage node of the bandgap voltage reference generation circuit via the first delta base-to-emitter-voltage resistor; and a second input to the second Darlington pair of transistors is connected to the output voltage node of the bandgap voltage reference generation circuit via a second delta base-to-emitter-voltage resistor in series with the first delta base-to-emitter-voltage resistor.

In Example 14, the subject matter of any one or more of Examples 12-13 optionally include wherein the circuit includes at least four delta base-to-emitter voltage generation circuits, wherein at least two of the at least four delta base-to-emitter voltage generation circuits include a Darlington pair of transistors and at least two of the at least four delta base-to-emitter voltage generation circuits do not include a Darlington pair of transistors.

Example 15 is a low supply headroom bandgap voltage reference generation circuit for generating a bandgap reference voltage from a supply voltage, the bandgap voltage reference generation circuit comprising: a first delta base-to-emitter voltage generation circuit, comprising a first Darlington configuration of a first pair of transistors arranged in a differential pair with a second Darlington configuration of a second pair of transistors, wherein: a first input to the first Darlington pair of transistors is connected to an output voltage node of the bandgap voltage reference generation circuit; and a second input to the second Darlington pair of transistors is connected to the output voltage node of the bandgap voltage reference generation circuit via a first delta base-to-emitter-voltage resistor, wherein a connection between the second input and the first delta base-to-emitter-voltage resistor comprises an intermediate node; a base-to-emitter voltage generation circuit, arranged between the intermediate node and a ground node.

In Example 16, the subject matter of Example 15 optionally includes wherein the first delta base-to-emitter voltage generation circuit provides a proportional to absolute temperature (PTAT) current and the base-to-emitter voltage generation circuit provides a complementary to absolute temperature (CTAT) current.

Example 17 is a method for operating a low supply headroom bandgap voltage reference circuit for generating a bandgap reference voltage from a supply voltage, the method comprising: generating a first current density in a first Darlington configuration of a first pair of transistors; generating a second current density in a second Darlington configuration of a second pair of transistors; and generating a difference in base-to-emitter voltage between the first Darlington configuration and the second Darlington configuration using a first delta base-to-emitter-voltage resistor to produce a proportional-to-absolute temperature current that is used for generating a temperature-stabilized bandgap reference voltage.

In Example 18, the subject matter of Example 17 optionally includes providing a first conduction terminal of a first transistor in the first Darlington configuration a supply voltage through a first reference resistor coupled to a supply voltage node; providing a first conduction terminal of a second transistor in the first Darlington configuration a supply voltage from the supply voltage node; providing a first conduction terminal of a third transistor in the second Darlington configuration a supply voltage through a second reference resistor coupled to the supply voltage node; and providing a first conduction terminal of a fourth transistor in the second Darlington configuration a supply voltage from the supply voltage node.

In Example 19, the subject matter of Example 18 optionally includes deriving a bandgap reference output value from a control terminal of the second transistor.

In Example 20, the subject matter of Example 19 optionally includes maintaining a same voltage on the first conduction terminal of the first transistor and the first conduction terminal of the third transistor using a differential amplifier, the differential amplifier including a first input coupled to the first conduction terminal of the first transistor, a second input coupled to the first conduction terminal of the third transistor, and an output coupled to the control terminal of the second transistor.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc., are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Such instructions can be read and executed by one or more processors to enable performance of operations comprising a method, for example. The instructions are in any suitable form, such as but not limited to source code, compiled code, interpreted code, executable code, static code, dynamic code, and the like.

Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A low supply headroom bandgap voltage reference generation circuit for generating a bandgap reference voltage from a supply voltage, the bandgap voltage reference generation circuit comprising:

a first delta base-to-emitter voltage generation circuit, comprising a first Darlington configuration of a first pair of transistors arranged in a differential pair with a second Darlington configuration of a second pair of transistors, wherein:

a first input to the first Darlington pair of transistors is connected to an output voltage node of the bandgap voltage reference generation circuit; and a second input to the second Darlington pair of transistors is connected to the output voltage node of the bandgap voltage reference generation circuit via a first delta base-to-emitter-voltage resistor.

2. The bandgap voltage reference generation circuit of claim 1, wherein a bandgap reference output voltage value carried on the output voltage node is equal to a supply voltage less a collector-to-base voltage of a first transistor in the second Darlington pair of transistors.

3. The bandgap voltage reference generation circuit of claim 1, comprising:

a first reference resistor and a second reference resistor, wherein a first end of the first reference resistor and a first end of a second reference resistor are coupled to a supply voltage node;

wherein a first conduction terminal of a first transistor in the first Darlington pair of transistors is connected to a second end of the first reference resistor and a first conduction terminal of a second transistor in the first Darlington pair of transistors is coupled to the supply voltage node; and wherein a first conduction terminal of a third transistor in the second Darlington pair of transistors is connected to a second end of the second reference resistor and a first conduction terminal of a fourth transistor in the second Darlington pair of transistors is coupled to the supply voltage node.

4. The bandgap voltage reference generation circuit of claim 3, wherein a second conduction terminal of the first transistor and a second conduction terminal of the third transistor are coupled together at a shared node;

wherein the shared node is coupled to a first bias current sink;

wherein a second conduction terminal of the second transistor is coupled to a second bias current sink;

wherein a second conduction terminal of the fourth transistor is coupled to a third bias current sink; and wherein a first bias current value of the first bias current sink is twice as large as a (1) second bias current value of the second bias current sink and is twice as large as (2) a third bias current value of the third bias current sink.

5. The bandgap voltage reference generation circuit of claim 4, comprising:

a differential amplifier, wherein a first input of the differential amplifier is coupled to the second end of the first reference resistor, wherein a second input of the differential amplifier is coupled to the second end of the second reference resistor.

6. The bandgap voltage reference generation circuit of claim 5, wherein an output of the differential amplifier is coupled to the output voltage node.

7. The bandgap voltage reference generation circuit of claim 6, wherein the first bias current value is shared equally between the first transistor and the third transistor.

8. The bandgap voltage reference generation circuit of claim 3, wherein the first transistor and the second transistor are bipolar junction transistors (BJTs);

wherein a collector of the first transistor is coupled to the second end of the first reference resistor;

wherein a collector of the second transistor is coupled to the supply voltage node; and wherein an emitter of the second transistor is coupled to a base of the first transistor.

9. The bandgap voltage reference generation circuit of claim 8, wherein an area of the first transistor and second transistor is different than an area of the third transistor and fourth transistor.

10. The bandgap voltage reference generation circuit of claim 8, wherein a base of the second transistor is coupled to the output voltage node carrying a bandgap reference output voltage value, wherein the bandgap reference output voltage value is equal to a supply voltage value carried on the supply voltage node less a collector to base voltage of the second transistor.

11. The bandgap voltage reference generation circuit of claim 3, wherein at least one of the first reference resistor and the second reference resistor include an active load.

12. The bandgap voltage reference generation circuit of claim 1, comprising at least one additional delta base-to-emitter voltage generation circuit.

13. The bandgap voltage reference generation circuit of claim 12, wherein at least one of the at least one additional delta base-to-emitter voltage generation circuit includes a third Darlington configuration of a third pair of transistors arranged in a differential pair with a fourth Darlington configuration of a fourth pair of transistors, wherein:

a third input to the third Darlington pair of transistors is connected to the output voltage node of the bandgap voltage reference generation circuit via the first delta base-to-emitter-voltage resistor; and a second input to the second Darlington pair of transistors is connected to the output voltage node of the bandgap voltage reference generation circuit via a second delta base-to-emitter-voltage resistor in series with the first delta base-to-emitter-voltage resistor.

14. The bandgap voltage reference generation circuit of claim 12, wherein the circuit includes at least four delta base-to-emitter voltage generation circuits, wherein at least two of the at least four delta base-to-emitter voltage generation circuits include a Darlington pair of transistors and at least two of the at least four delta base-to-emitter voltage generation circuits do not include a Darlington pair of transistors.

15. A low supply headroom bandgap voltage reference generation circuit for generating a bandgap reference voltage from a supply voltage, the bandgap voltage reference generation circuit comprising:

a first delta base-to-emitter voltage generation circuit, comprising a first Darlington configuration of a first pair of transistors arranged in a differential pair with a second Darlington configuration of a second pair of transistors, wherein:

a first input to the first Darlington pair of transistors is connected to an output voltage node of the bandgap voltage reference generation circuit;

a second input to the second Darlington pair of transistors is connected to the output voltage node of the bandgap voltage reference generation circuit via a first delta base-to-emitter-voltage resistor, wherein a connection between the second input and the first delta base-to-emitter-voltage resistor comprises an intermediate node; and a base-to-emitter voltage generation circuit, arranged between the intermediate node and a ground node.

16. The low supply headroom bandgap voltage reference generation circuit of claim 15, wherein the first delta base-to-emitter voltage generation circuit provides a proportional to absolute temperature (PTAT) current and the base-to-emitter voltage generation circuit provides a complementary to absolute temperature (CTAT) current.

17. A method for operating a low supply headroom bandgap voltage reference circuit for generating a bandgap reference voltage from a supply voltage, the method comprising:

generating a first current density in a first Darlington configuration of a first pair of transistors;

generating a second current density in a second Darlington configuration of a second pair of transistors; and generating a difference in base-to-emitter voltage between the first Darlington configuration and the second Darlington configuration using a first delta base-to-emitter-voltage resistor to produce a proportional-to-absolute temperature current that is used for generating a temperature-stabilized bandgap reference voltage.

18. The method of claim 17, comprising:

providing a first conduction terminal of a first transistor in the first Darlington configuration a supply voltage through a first reference resistor coupled to a supply voltage node;

providing a first conduction terminal of a second transistor in the first Darlington configuration a supply voltage from the supply voltage node;

providing a first conduction terminal of a third transistor in the second Darlington configuration a supply voltage through a second reference resistor coupled to the supply voltage node; and providing a first conduction terminal of a fourth transistor in the second Darlington configuration a supply voltage from the supply voltage node.

19. The method of claim 18, comprising:

deriving a bandgap reference output value from a control terminal of the second transistor.

20. The method of claim 19, comprising:

maintaining a same voltage on the first conduction terminal of the first transistor and the first conduction terminal of the third transistor using a differential amplifier, the differential amplifier including a first input coupled to the first conduction terminal of the first transistor, a second input coupled to the first conduction terminal of the third transistor, and an output coupled to the control terminal of the second transistor.

* * * * *